Nov. 8, 1960 A. S. DUBUAR 2,959,642
TELEPHONE SYSTEM
Filed May 23, 1958
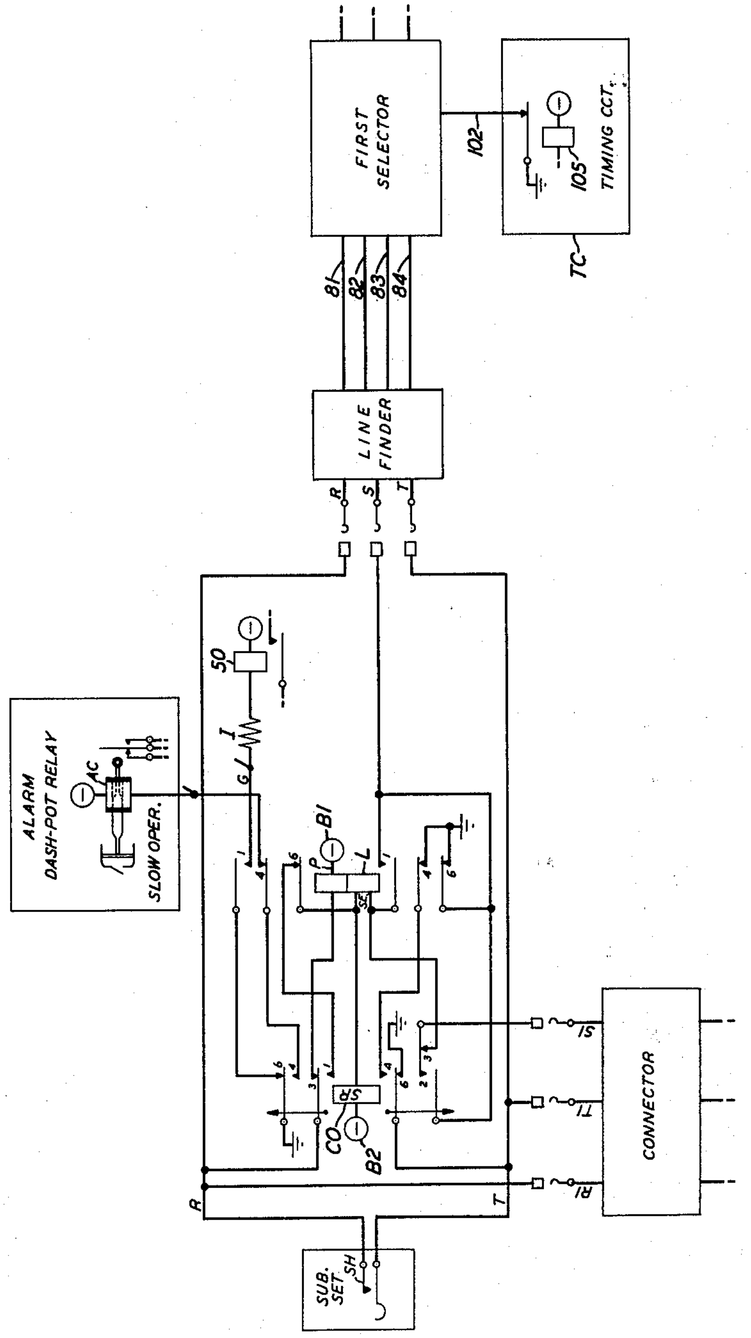
INVENTOR
A.S. DUBUAR
BY S.E. Hollander
ATTORNEY

United States Patent Office 2,959,642

Patented Nov. 8, 1960

2,959,642

TELEPHONE SYSTEM

Arthur S. Dubuar, Parsippany-Troy Hills, N.J., assignor to Bell Telephone Laboratories, Incorporated, New York, N.Y., a corporation of New York Filed May 23, 1958, Ser. No. 737,420

19 Claims. (Cl. 179—18)

This invention relates to automatic telephone systems and more particularly to automatic telephone systems incorporating lockout arrangements.

A lockout arrangement used in conjunction with a line circuit effectuates the isolation of a subscriber's line from the central office apparatus when a fault condition or other abnormal situation occurs.

In certain telephone systems, removal of the handset from the switchhook closes the loop between the subscriber and the central office. A line relay at the central office is energized and initiates operation of a line finder to hunt for the line requesting service. When the line finder locates the terminals of the calling line, it applies a ground condition to the sleeve lead of the line circuit and extends the tip and ring leads to a first selector. Subsequent dialing signals by the calling subscriber further extend the connection to the called subscriber in a well-known manner.

If the line loop is closed as the result of a fault on the line, a connection is extended to the first selector, as described above, and the line finder and first selector are held seized by the faulted line and cannot service other lines. Thus a short circuit of a subscriber's line from tip to ring or from ring to ground will cause a line finder and first selector to remain out of service until the fault condition is remedied.

It is, therefore, an object of this invention to provide for isolation of a faulted subscriber's line from the line finder and first selector, freeing the latter equipment for service.

An additional object of this invention is to provide an alarm signal when a line is isolated in consequence of a fault or other permanent condition on the line.

Another object of this invention is to cause a connector to receive a busy signal when an attempt is made to connect to an isolated line.

A feature of this invention is the use of single-step line and cut-off relays in a new configuration to accomplish the objectives described above. The term "single-step" relay is used to denote a relay in which all the contacts are arranged to be fully operated in a single movement of the armature as distinguished from those relays in which partial operation of the armature closes one set of contacts and further armature displacement closes additional contacts. The latter are sometimes referred to as two-step relays.

The above objects and features of the invention are realized in an illustrative embodiment in which the line and cut-off relays are arranged to provide lockout features. The configuration is such that the line finder and first selector are disconnected from the faulted line if the line relay is operated and dialing does not take place within a predetermined interval of time.

The lockout condition is manifested by release of the line relay while the cut-off relay remains operated. A permanent signal alarm is energized at this time and ground is connected to the sleeve lead to prevent a connector from making a connection to the faulted line.

The circuit is self-restoring and the lockout condition is cancelled when the permanent condition (e.g., handset off-hook) is removed from the line or the line fault is alleviated.

These and other objects and features of the invention may be more readily comprehended from an examination of the following specification, appended claims and attached drawing, the single figure of which shows an illustrative embodiment of the invention illustrating the novel configuration of single step line and cut-off relays.

Referring to the drawing, it may be seen that when the subscriber removes his receiver from the switchhook and the switchhook contacts SH close the loop between the tip and ring leads T and R, relay L operates at the central office. The path for the operation of relay L may be traced from battery B1, winding P of relay L, No. 3 upper contacts of relay CO, loop conductor R, the closed switchhook contacts SH at the subscriber's substation, loop conductor T, No. 6 lower contacts of relay CO to ground.

The operation of relay L connects ground to lead G to operate common start relay 50 and initiate the functioning of an idle line finder which hunts for the calling line and extends a connection to the first selector. The operation of the line finder and first selector are well known and are explained in detail in Patent No. 2,210,068 to T. L. Dimond of August 6, 1940, and Patent No. 2,225,305 to G. V. King and P. W. Swenson of December 17, 1940, which patents are herewith incorporated by reference. It will be noted that certain structural elements common to the above-referred-to-patent disclosures and the instant invention are similarly designated.

Relay 50 is operated over a path including ground, No. 6 upper contacts of relay CO, No. 1 upper contacts of relay L, lead G, resistance I, winding of relay 50 to negative battery.

The operation of relay L connects battery B2 through the winding of relay CO, winding SE of relay L, No. 1 lower contacts of relay L to the sleeve lead S, to place a marking potential on the terminal for which the line finder will hunt.

When the line finder selects the terminals of the calling line, it applies ground to the sleeve lead S and extends of the connection through to the next circuit which is the first selector. Ground on sleeve lead S completes a circuit for the operation of relay CO, which circuit was traced in part above.

The operating circuit for relay L, described above, is now interrupted at the No. 3 upper contacts of relay CO. Relay L remains operated, however, over winding SE through the path traced for the operation of relay CO.

The ground condition placed on sleeve lead S by the line finder is extended over the No. 2 lower contacts of relay CO to the sleeve conductor S1 of the connector multiple as a busy indication. Reference may be had to Automatic Telephony by Smith and Campbell, 2d edition (1921), pages 55–59 for a complete description of the operation of a connector circuit.

Operation of relay CO interrupts the ground connection to the start lead G and releases relay 50 at the No. 6 upper contacts of relay CO. In addition, relay CO, in operating, disconnects battery B1 and ground from conductors R and T, respectively, through the opening of the No. 3 upper contacts of relay CO and the No. 6 lower contacts of relay CO. The subscriber now dials the called party's directory number to automatically complete the switching of the call in accordance with well-known principles. In normal operation, relays CO and L remain operated for the duration of the call.

If a short-circuit condition of fault exists between tip conductor T and ring conductor R, or between conductor R and ground, the apparatus will function in a manner similar to that described above for a normal originating call. The line finder and first selector would be energized as explained above, but, inasmuch as this equipment has been seized as the result of a spurious signal, no dialing by the subscriber takes place. Under these circumstances the line finder and first selector would be held seized by the faulted line until the difficulty was remedied. The circuitry of the invention is arranged to recognize this condition and prevent extended seizure of the common control equipment by a faulted line. In this respect it is understood that a so-called faulted line includes a line on which a permanent off-hook condition exists.

The present apparatus is arranged to permit a finite time interval after the operation of relay L for dialing by the subscriber to begin. If dialing does not take place within a predetermined interval after seizure of the line finder and first selector, the equipment is conditioned to respond as though a fault existed on the line. After the lapse of the preselected time interval, relay 105 in the timing circuit TC operates removing ground from line 102 which, in turn, through the first selector and conductor 83, removes ground from the sleeve lead S to the line finder. The timing apparatus is shown symbolically in the drawing and is well known in the art. For a detailed disclosure of apparatus suitable for use as a timing circuit in conjunction with the present invention, reference may be made to the above-referred-to patent to King and Swenson.

When the ground is removed from the sleeve lead S, relays CO and L both begin to release. Since relay CO is designed as a slow-release relay it remains operated for a brief interval after the release of relay L. Relay L, in releasing, places a ground condition on the tip lead T of the subscriber line, and battery is connected through relay CO to the ring conductor R. Ground is applied to the tip lead T over the No. 4 lower contacts of relay L and the No. 4 lower contacts of relay CO. The path for connection of battery to the ring conductor includes battery B2, winding of relay CO, No. 6 upper contacts of relay L, No. 1 upper contacts of relay CO to the ring conductor R.

If the condition which occasioned the fault persists, relay CO remains operated over a path including battery B2, winding of relay CO, No. 6 upper contacts of relay L, No. 1 upper contacts of relay CO to the ring conductor R. Since the abnormal condition may be manifested by a ground on the ring conductor either directly or by a connection to the tip conductor, a complete path for the continued operation of relay CO is maintained.

The condition of relay CO operated and relay L released is the lockout condition. A permanent signal alarm relay AC is energized over the No. 4 upper contacts of relay CO and the No. 4 upper contacts of relay L. Ground is connected to the sleeve conductor S1 of the connector multiple over a path including the No. 6 lower contacts of relay L, No. 2 lower contacts of relay CO, to the sleeve conductor S1. A connector attempting to effect a connection to this line will find a busy condition on sleeve lead S1. If the abnormal condition is removed from the line, i.e., ground is removed from ring conductor R, relay CO releases and the circuit is restored to normal.

To prevent the operation of alarm relay AC when relays L and CO release during normal operation, a slow-to-operate relay, which is shown by way of illustration as a dash-pot relay, is utilized. Relay CO is designed to release before relay AC operates unless a fault condition exists, in which instance relay CO fails to release as explained above.

It will be noted that when a connector is directed to this line under normal operating conditions, ground is applied to sleeve lead S1 operating relays CO and L over a path including No. 3 lower contacts of relay CO, winding SE of relay L, winding of relay CO, to negative battery B2. A locking path is established through the No. 2 lower contacts of relay CO, No. 1 lower contacts of relay L, winding SE of relay L, winding of relay CO to battery B2. The operation of relay CO removes battery and ground from the ring lead R at the No. 3 contacts of relay CO and the tip lead T at the No. 6 contacts of relay CO to prepare for ringing. The operation of relays L and CO may be summarized as follows:

(1) Line circuit idle—relays CO and L released;
(2) Line circuit closed (calling for line finder)—relay CO released, relay L operated;
(3) Line finder connects to calling line—relays CO and L operated;
(4) Talking circuit completed—relays CO and L remain operated for duration of call;
(5) Lockout—relay CO operated, relay L released.

Although an exemplary embodiment of the invention has been illustrated, it will be understood by those skilled in the art that various modifications may be made without departing from the scope of the invention.

What is claimed is:

1. An automatic telephone switching system including a plurality of subscribers' lines, a first relay connected to one of said lines and operative in response to a calling condition on said line, line finder means connectable to said line in response to the operation of said first relay, a second relay connected to said first relay and operative in response to the connection of said line finder to said line, timing means, and means responsive to the operation of said first and second relays and said timing means after the lapse of a predetermined interval of time for releasing said first relay and disconnecting said line finder means from said line.

2. An automatic telephone switching system including a plurality of subscribers' lines, a first relay connected to one of said lines and operative in response to a calling condition on said line, line finder means connectable to said line in response to the operation of said first relay, a second relay connected to said first relay and operative in response to the connection of said line finder to said line, connector means connectable to said line incident to a call incoming to said line, timing means, and means responsive to the operation of said first and second relays and said timing means after the lapse of a predetermined time interval for releasing said first relay and disconnecting said line finder means from said line and preventing said connector from effecting a connection to said line.

3. An automatic telephone switching system including a plurality of subscribers' lines, a first relay connected to one of said lines and operative in response to a calling condition on said line, line finder means connectable to said line in response to the operation of said first relay, a second relay connected to said first relay and operative in response to the connection of said line finder to said line, alarm indicating means connected to said relays, timing means, and means responsive to the operation of said first and second relays and said timing means after the lapse of a predetermined interval of time for releasing said first relay and disconnecting said line finder means from said line and operating said alarm indicating means.

4. An automatic telephone switching system including a plurality of subscribers' lines, a first relay connected to one of said lines and operative in response to a calling condition on said line, line finder means connectable to said line in response to the operation of said first relay, a second relay connected to said first relay and operative in response to the connection of said line finder to said line, timing means operative to measure a predetermined interval, connector means connectable to said line incident to a call incoming to said line, alarm indicating means connected to said relays, and means connected to said timing means and responsive to the operation of said first and second relays and the measurement of a first predetermined interval of time by said timing means for releasing said first relay and disconnecting said line finder means from said line and preventing said connector from effecting a connection to said line, said alarm indicating means being operative in response to the operation of said second relay, the release of said first relay and the lapse of a second predetermined interval of time.

5. An automatic telephone switching system including a plurality of subscribers' lines, a first relay connected to one of said lines and operative in response to a calling condition on said line, line finder means connectable to said line in response to the operation of said first relay, a second relay connected to said first relay and operative in response to the connection of said line finder to said line, connector means connectable to said line incident to the extension of an incoming call to said line, selector means connectable to said line under control of said line finder means, timing means connected to said selector means, and means responsive to the operation of said first and second relays and the measurement of a predetermined interval of time by said timing means for releasing said first relay and disconnecting said line finder means and said selector means from said line and preventing said connector means from effecting a connection to said line.

6. An automatic telephone switching system including a plurality of subscribers' lines, a first one-step relay connected to one of said lines and operative in response to a calling condition on said line, line finder means connectable to said line in response to the operation of said first relay, a second one-step relay connected to said first relay and operative in response to the connection of said line finder to said line, timing means, and means connected to said timing means and responsive to the operation of said first and second relays and said timing means after the lapse of a predetermined interval of time for releasing said first relay and disconnecting said line finder means from said line.

7. An automatic telephone switching system including a plurality of subscribers' lines, a first one-step relay connected to one of said lines and operative in response to a calling condition on said line, line finder means connectable to said line in response to the operation of said first relay, a second one-step relay connected to said first relay and operative in response to the connection of said line finder to said line, connector means connectable to said line incident to a call incoming to said line, timing means operative to measure a predetermined interval, and means responsive to the operation of said first and second relays and said timing means after the lapse of said predetermined time interval for releasing said first relay and disconnecting said line finder means from said line and preventing said connector from effecting a connection to said line.

8. An automatic telephone switching system including a plurality of subscribers' lines, a first one-step relay connected to one of said lines and operative in response to a calling condition on said line, line finder means connectable to said line in response to the operation of said first relay, a second one-step relay connected to said first relay and operative in response to the connection of said line finder to said line, timing means operative to measure a predetermined interval, connector means connectable to said line incident to a call incoming to said line, alarm indicating means connected to said relays, and means connected to said timing means and responsive to the operation of said first and second relays and the measurement of a first predetermined interval of time by said timing means for releasing said first relay and disconnecting said line finder means from said line and preventing said connector from effecting a connection to said line, said alarm indicating means being operative in response to the operation of said second relay, the release of said first relay and the lapse of a second predetermined time interval.

9. An automatic telephone switching system including a plurality of subscribers' lines, a first one-step relay connected to one of said lines and operative in response to a calling condition on said line, finder means connectable to said line in response to the operation of said first relay, a second one-step relay connected to said first relay and operative in response to the connection of said line finder to said line, connector means connectable to said line incident to the extension of an incoming call to said line, selector means connectable to said line under control of said line finder means, timing means connected to said selector means, and means responsive to the operation of said first and second relays and the measurement of a predetermined interval of time for releasing said first relay and disconnecting said line finder and selector means from said line and preventing said connector means from effecting a connection to said line.

10. An automatic telephone switching system including a plurality of subscribers' lines, said subscribers' lines each including a ring conductor and a tip conductor, a first one-step relay connected to one of said lines and operative in response to a calling condition on said line, line finder means connectable to said line in response to the operation of said first relay, a second one-step relay connected to said first relay and operative in response to the connection of said line finder to said line, alarm indicating means connected to said relays, said first relay including a primary winding and a secondary winding, said second relay including a winding thereon, means connecting the winding of said second relay in series with the secondary winding of said first relay, means connecting said primary winding of said first relay to said ring conductor, timing means operative to measure a predetermined time interval, and means responsive to the operation of said first and second relays and said timing means after the lapse of said predetermined interval of time for disconnecting said line finder means from said line and operating said alarm indicating means.

11. An automatic telephone switching system including a plurality of subscribers' lines, said subscribers' lines each including a ring conductor and a tip conductor, a first one-step relay connected to one of said lines and operative in response to a calling condition on said line, line finder means connectable to said line in response to the operation of said first relay, a second one-step relay connected to said first relay and operative in response to the connection of said line finder to said line, timing means operative to measure a predetermined interval, connector means connectable to said line incident to a call incoming to said line, alarm indicating means connected to said relays, said first relay including a primary winding and a secondary winding, said second relay including a winding thereon, means connecting the winding of said second relay in series with the secondary winding of said first relay, means connecting said primary winding of said first relay to said ring conductor, and means responsive to the operation of said first and second relays and the measurement of a first predetermined interval of time by said timing means for disconnecting said line finder means from said line and preventing said connector from effecting a connection to said line, said alarm indicating means being operative in response to the operation of said second relay, the release of said first relay and the lapse of a second predetermined interval of time.

12. An automatic telephone switching system including a plurality of subscribers' lines, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, timing means operative to measure a predetermined time interval, and means responsive to the operation of said first and second relays and said timing means after the lapse of said predetermined interval of time for releasing said first relay and disconnecting said line finder means from said line.

13. An automatic telephone switching system including a plurality of subscribers' lines, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, connector means connectable to said line incident to a call incoming to said line, timing means operative to measure a predetermined time interval, and means responsive to the operation of said first and second relays and the measurement of a predetermined time interval by said timing means for disconnecting said line finder means from said line and preventing said connector from effecting a connection to said line.

14. An automatic telephone switching system including a plurality of subscribers' lines, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, connector means connectable to said line incident to the extension of an incoming call to said line, selector means connectable to said line under control of said line finder means, timing means connected to said selector means, and means responsive to the operation of said first and second relays and the measurement of a predetermined interval of time by said timing means for releasing said first relay and disconnecting said line finder and selector means from said line and preventing said connector means from effecting a connection to said line.

15. An automatic telephone switching system including a plurality of subscribers' lines, said subscribers' lines each including a ring conductor and a tip conductor, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, said first relay including a primary winding and a secondary winding, said second relay including a winding thereon, means connecting the winding of said second relay in series with the secondary winding of said first relay, means connecting said primary winding of said first relay to said ring conductor, timing means operative to measure a predetermined interval, and means responsive to the operation of said first and second relays and the measurement of a predetermined interval of time by said timing means for releasing said first relay and disconnecting said line finder means from said line.

16. An automatic telephone switching system including a plurality of subscribers' lines, a first one-step relay connected to one of said lines and operative in response to a calling condition on said line, said subscribers' lines each including a ring conductor and a tip conductor, line finder means connectable to said line in response to the operation of said first relay, a slow-to-release second one-step relay connected to said first relay and operative in response to the connection of said line finder to said line, connector means connectable to said line incident to a call incoming to said line, said first relay including a primary winding and a secondary winding, said second relay including a winding thereon, means connecting the winding of said second relay in series with the secondary winding of said first relay, means connecting said primary winding of said first relay to said ring conductor, timing means operative to measure a predetermined time interval, and means responsive to the operation of said first and second relays and the measurement of a predetermined time interval by said timing means for releasing said first relay and disconnecting said line finder means from said line and preventing said connector from effecting a connection to said line.

17. An automatic telephone switching system including a plurality of subscribers' lines, said subscribers' lines each including a ring conductor and a tip conductor, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, alarm indicating means connected to said relay, said first relay including a primary winding and a secondary winding, means connecting the winding of said second relay in series with the secondary winding of said first relay, means connecting said primary winding of said first relay to said ring conductor, timing means operative to measure a predetermined time interval, and means responsive to the operation of said first and second relays and the measurement of a predetermined interval of time by said timing means for releasing said first relay and disconnecting said line finder means from said line and operating said alarm indicating means.

18. An automatic telephone switching system including a plurality of subscribers' lines, said subscribers' lines each including a ring conductor and a tip conductor, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, timing means operative to measure a predetermined interval, connector means connectable to said line in response to the placing of a call to said line, alarm indicating means connected to said relays, said first relay including a primary winding and a secondary winding, means connecting the winding of said second relay in series with the secondary winding of said first relay, means connecting said primary winding of said first relay to said ring conductor, and means responsive to the operation of said first and second relays and the measurement of a first predetermined interval of time by said timing means for releasing said first relay and disconnecting said line finder means from said line and preventing said connector from effecting a connection to said line, said alarm indicating means being operative in response to the operation of said second relay, the release of said first relay and the lapse of a second predetermined interval of time.

19. An automatic telephone switching system including a plurality of subscribers' lines, said subscribers' lines each including a ring conductor and a tip conductor, a first one-step relay connected to one of said lines and operative in response to a calling condition on said line, line finder means connectable to said line in response to the operation of said first relay, a slow-to-release second one-step relay connected to said first relay and operative in response to the connection of said line finder to said line, connector means connectable to said line incident to the extension of an incoming call to said line, selector means connectable to said line under control of said line finder means, timing means connected to said selector means, said first relay including a primary winding and a secondary winding, means connecting the winding of said second relay in series with the secondary winding of said first relay, and means responsive to the operation of said first and second relays and the measurement of a predetermined interval of time by said timing means for releasing said first relay and disconnecting said line finder and selector means from said line and preventing said connector means from effecting a connection to said line.

References Cited in the file of this patent

UNITED STATES PATENTS

| | | |
|---|---|---|
| 2,658,109 | Kessler | Nov. 3, 1953 |
| 2,716,674 | Kahn | Aug. 30, 1955 |